(12) United States Patent
Dietrich et al.

(10) Patent No.: US 7,389,302 B2
(45) Date of Patent: Jun. 17, 2008

(54) METHOD FOR GENERATING A STRUCTURE REPRESENTATION WHICH DESCRIBES A SPECIFIC AUTOMATION SYSTEM

(75) Inventors: Fabian Dietrich, Nürnberg (DE); Bernd Hieber, Herzogenaurach (DE); Thomas Jachmann, Wendelstein (DE); Uwe Rückl, Berlin (DE); Thomas Woiciechowsky, Pegnitz (DE)

(73) Assignee: Siemens Aktiengesellschaft, Munich (DE)

( * ) Notice: Subject to any disclaimer, the term of this patent is extended or adjusted under 35 U.S.C. 154(b) by 81 days.

(21) Appl. No.: 10/565,411

(22) PCT Filed: Jun. 24, 2004

(86) PCT No.: PCT/DE2004/001379

§ 371 (c)(1),
(2), (4) Date: Feb. 13, 2006

(87) PCT Pub. No.: WO2005/010625

PCT Pub. Date: Feb. 3, 2005

(65) Prior Publication Data
US 2007/0005171 A1    Jan. 4, 2007

(30) Foreign Application Priority Data
Jul. 22, 2003 (DE) ............................ 103 33 889

(51) Int. Cl.
| G06F 7/00 | (2006.01) |
| G06F 17/00 | (2006.01) |
| G06F 19/00 | (2006.01) |
| G06F 3/00 | (2006.01) |
| G06F 3/048 | (2006.01) |
| G05B 19/42 | (2006.01) |

(52) U.S. Cl. .................. 707/102; 700/86; 700/97; 715/738; 715/839; 715/853; 715/965; 717/107

(58) Field of Classification Search ........... 715/700, 715/738, 764, 810, 835, 839, 853, 961, 965; 716/1–6; 700/83, 86, 97; 703/23, 28; 705/8; 707/102; 717/107; 719/321
See application file for complete search history.

(56) References Cited

U.S. PATENT DOCUMENTS

| 5,625,565 | A | * | 4/1997 | Van Dyke ................ 716/1 |
| 5,831,869 | A | * | 11/1998 | Ellis et al. .............. 716/6 |
| 5,892,900 | A | * | 4/1999 | Ginter et al. ............ 726/26 |
| 5,920,861 | A | * | 7/1999 | Hall et al. .............. 707/9 |
| 6,195,591 | B1 | | 2/2001 | Nixon et al. |
| 6,826,539 | B2 | * | 11/2004 | Loveland ................ 705/7 |
| 6,865,429 | B1 | * | 3/2005 | Schneider et al. ......... 700/86 |
| 6,915,304 | B2 | * | 7/2005 | Krupa .................. 707/102 |
| 7,024,475 | B1 | * | 4/2006 | Abaye et al. ............ 709/224 |
| 7,184,967 | B1 | * | 2/2007 | Mital et al. ............. 705/8 |
| 2002/0016707 | A1 | * | 2/2002 | Devoino et al. .......... 703/22 |
| 2003/0016242 | A1 | * | 1/2003 | Ramahefarivony et al. . 345/738 |
| 2004/0031015 | A1 | * | 2/2004 | Ben-Romdhane et al. .. 717/107 |
| 2004/0078105 | A1 | * | 4/2004 | Moon et al. ............. 700/100 |
| 2004/0170138 | A1 | * | 9/2004 | Blevins et al. ........... 370/328 |
| 2005/0021705 | A1 | | 1/2005 | Jurisch |
| 2005/0039193 | A1 | * | 2/2005 | Choi et al. ............. 719/321 |

FOREIGN PATENT DOCUMENTS

| DE | 198 34 943 A1 | 2/1999 |
| DE | 19834943 A1 * | 2/1999 |
| DE | 100 53 665 A1 | 5/2002 |
| DE | 101 32 036 A1 | 1/2003 |
| WO | WO 02/31607 A2 | 4/2002 |
| WO | WO 03/036400 A1 | 5/2003 |

OTHER PUBLICATIONS

"XML Path Language (XPATH)-Version 1.0", (J. Clark, S. DeRose), W3C Recommendation, pp. 1-30, Nov. 16, 1999.
"XML basierte Gerätebeschreibung, FDCML—Field Device Configuration Markup Language", (Krumisiek), ZVEI Automation, pp. 1-38.
DRIVECOM Gerätebeschreibung, Version 1.1, pp. 1-24, May 2002.

English translation of Krumisiek: "XML basierte Gerätebeschreibung", www.FDCML.org, Phoenix Contact GmbH & Co. KG, pp. 17-26 and 34-36 (previously submitted in an IDS dated Jan. 23, 2006).

English translation of DRIVECOM: "Gerätebeschreibung", Version 1.1, 28. Blomberg, Germany, May 2002, chapter 3.6.3, pp. 13/24 and 14/24 (previously submitted in an IDS dated Jan. 23, 2006).

* cited by examiner

*Primary Examiner*—Crystal J. Barnes
(74) *Attorney, Agent, or Firm*—Laurence A. GreenBerg; Werner H. Stemer; Ralph E. Locher

(57) ABSTRACT

The invention facilitates the creation of a control software for a data processing device of a specific automation system. The method generates a structure representation, describing a specific automation system, from a model structure representation which describes a general automation system. The model structure representation includes a structured representation of functional groups of the general automation system and the interconnections thereof and each functional group can be associated with one or several components of the specific automation system. The method includes the following steps:—preparation of a text file, reproducing the model structure representation, for a data processing device which controls the specific automation system,—determination of the components of said specific automation system, which can be associated together with a functional group of the model structure representation, by the data processing device and—entry of the determined components into the model structure representation with generation of the structure representation, describing the specific automation system.

14 Claims, 4 Drawing Sheets

METHOD FOR GENERATING A STRUCTURE REPRESENTATION WHICH DESCRIBES A SPECIFIC AUTOMATION SYSTEM

BACKGROUND OF THE INVENTION

Field of the Invention

To control or monitor automated processes, what are known as automation systems are normally used today. The automated processes may be process-engineering processes, automated production methods or else generation and distribution systems for electrical power, for example. An automation system normally comprises field transmitters which are connected to the automated process, which are arranged in proximity to the process and which use suitable sensors, such as current and voltage converters, flow meters or concentration measuring instruments, to obtain particular measured data from the process (e.g. currents, voltages, mass flows, concentrations). On the basis of these measured data, the process can be monitored and controlled. By way of example, the measured data can be forwarded to suitable output devices, such as screen displays, and can be shown there, for example in the form of graphics or tables, to the operating personnel for the respective process. If the field transmitters are what are known as electrical protective devices then the captured measured data are normally checked automatically for observance of particular operating parameters and, if the prescribed operating parameters are not observed, a suitable protective measure is automatically taken, such as opening a circuit breaker in an electrical power distribution system.

Normally such automation systems are controlled by data processing devices which can use a suitable piece of control software to perform all the steps required for control and monitoring. To this end, such a data processing device and the relevant control software need to be matched, inter alia, precisely to the structure or design of the respective specific automation system for the relevant process which has to be automated. Such matching is today usually carried out in the actual programming stage of the relevant control software for the data processing device in a respective specific automation system, which means that the programmers and developers of this control software actually need to know the design of the specific automation system at the time of programming.

By way of example, German laid-open specification DE 100 53 665A1 discloses a process control system or an automation system for remotely monitoring and controlling process-engineering processes. In the case of the process control system known from the laid-open specification, the measured data are displayed and the process control system is operated using a process display which is stored to a central location in the data processing device and which contains the specific structure of the automation system for the relevant process. This process display has been created manually and stored at the central location in the data processing device before the automation system is actually started up. In the event of any changes to the automation system, this process display also needs to be matched accordingly.

SUMMARY OF THE INVENTION

The invention is based on the object of specifying a method which provides a comparatively simple way of producing a piece of control software for a data processing device in a specific automation system.

The invention achieves this object by means of a method for generating a structure representation which describes a specific automation system from a model structure representation which describes a general automation system, where the model structure representation has a structured representation of functional groups in the general automation system and their links to one another, and each functional group can be assigned one or more components of the specific automation system, and where the following steps are performed:

a text file reproducing the model structure representation is provided for a data processing device which controls the specific automation system;

those components of the specific automation system which can be jointly assigned to a functional group in the model structure representation are ascertained by the data processing device, and the ascertained components are entered into the model structure representation to generate the structure representation which describes the specific automation system.

The fundamental advantage of the inventive method is that the software for the data processing device which controls the specific automation system does not need to be manually matched individually to the specific automation system. The reason for this is that the inventive method involves only a model structure representation which describes a general automation system being provided in the software at the time of programming, said model structure representation being automatically matched to the specific automation system only when the automation system is started up.

In other words, a general piece of control software is provided containing a model which applies to the design of various automation systems and which, when a specific system is started up, is independently—that is to say without any manual settings—matched to the design or structure thereof.

Another advantage of the inventive method is that this allows the creation of a general piece of control software which can be matched to a multiplicity of different automation systems. There is thus no separate creation of a respective piece of control software for every single instance of various automation systems.

In one advantageous development of the inventive method, instructions contained in the text file prompt the data processing device to check only selected functional groups to determine whether a plurality of components of the specific automation system can be jointly assigned to this functional group. In this way, the model structure representation can be matched to the structure representation of the specific automation system particularly quickly and efficiently, since it is actually possible to stipulate in advance those functional groups for which a plurality of components of the automation system can be assigned in the first place. There is thus no checking of the other functional groups by the data processing device.

In another advantageous embodiment of the inventive method, the data processing device ascertains those components of the specific automation system which can be jointly assigned to a functional group in the model structure representation by sending an electronic query to the respective components or to a common control device which is superordinate to them, and the respective components or the common control device which is superordinate to them respond(s) to this electronic query by sending an electronic response to the data processing device with an identification key which is respectively unique for them. In this way, the plurality of components which can be assigned to a common functional group can be identified particularly easily, since the data processing device can do this merely by asking the multiple instances of components for their unique identification keys. The respective unique identification key can be used to distinguish each component of the specific automation system clearly from all other components. Identification keys within this context may be slot numbers, unique addresses, component identification numbers, component names arising once within the specific automation system and product or serial numbers for individual components, for example.

In this context, the electronic query within the scope of the invention may also be sent to a common control device—usually a software module—which is superordinate to the respective components of the specific automation system and which controls the response from the respective identification key if more than one component can be assigned to the relevant functional group.

In this connection, it is also considered to be advantageous if components of the specific automation system which can each be jointly assigned to a functional group in the model structure representation use identification keys of the same type when sending the electronic response. In this way, the relevant components can be distinguished particularly easily, since although all the components of the specific automation system which can be assigned to a functional group have different values of identification keys, they generally use the same type of identification key. By way of example, in this context the identification key used is a slot number which can be used for identifying the respective components clearly from their different identification key values, that is to say in this case different slot numbers.

In addition, it is considered to be an advantageous development of the inventive method if the respective components additionally send further data characterizing them with the electronic response. In the case of this development, specific further information about the relevant components of the automation system can advantageously be picked up by the data processing device when the specific automation system is actually started up. Examples of such further information may be a more precise description of the relevant component, its respective status (on, off, fault) or, by way of example, the formats of the data which this component needs to send to the data processing device and receive while the automation system is operating.

It is considered to be a further advantageous refinement of the inventive method that even a functional group which can be assigned a single component has this component ascertained and entered into the model structure representation to complete the structure representation which describes the specific automation system. In this way, the full automation system with all the components can be identified and entered into the structure representation actually within the startup described above. In line with this development, components which are the only ones to be able to be assigned to a particular functional group in the model structure representation are thus also additionally identified and entered into the model structure representation.

Particularly advantageously, the respective components of the specific automation system can be addressed and identified by the data processing device if the respective components of the specific automation system are addressed by the data processing device using a component path which contains at least one identification for the respective component. In this context, a component path can be constructed in similar fashion to file, directory or device paths which are known from operating systems for home and office computers.

It is also considered to be advantageous if the data processing device ascertains information which is typical of a component of a functional group or which is common to a plurality of components of a functional group by generating a type path which indicates the relevant functional group from the relevant component path, and the data processing device uses this type path to read the information for the relevant functional group from the text file. In this way, it is merely possible to use the component path corresponding to a respective component to ascertain information which is typical of this component from the relevant functional group following conversion into a type path. Such information may be, by way of example, the type of components which can be assigned to this functional group, and formats for the data which are to be interchanged with these components.

A type path indicating the relevant functional group can be generated by the data processing device particularly easily if the data processing device generates the type path from the component path by removing the at least one identification for the respective component from the component path to form the type path.

In this connection, it is also regarded as being particularly advantageous that the component path and the type path are formulated using the language XPath. The language XPath is a language for navigation and addressing particularly in XML documents which has been normalized by the international standardization committee W3C. More detailed information on XPath can be found at http://www.w3.org/TR/xpath.

Furthermore, in another advantageous embodiment of the inventive method, the structure representation which describes the specific automation system is converted into a graphical representation by the data processing device. Such a graphical representation can be used by an operator of the automation system to obtain a fast and comprehensive overview of the full automation system.

It is regarded as particularly advantageous in this connection if the graphical representation based on the structure representation is displayed using a user device which belongs to the data processing device. In this context, an operator of the automation system can particularly advantageously obtain an overview of the precise design of the specific automation system, for example using a user device connected to a central computer in the data processing device, such as a control station or a laptop.

In this context, it may also be advantageous if the structure representation is converted into the graphical representation, and displayed, using a browser device on the user device. In this way, a user device can obtain access to the graphical representation of the structure of the specific automation system particularly easily in an Internet-based automation system, for example, because a browser device can be used for access which is largely independent of hardware and operating system.

It is also regarded as particularly advantageous that XML is used for the text file reproducing the model structure representation. The XML (Extended Markup Language) format is particularly well suited to describing hierarchically structured systems. For this reason, it can also be used with particular advantage to represent a normally hierarchically structured design for an automation system. The XML format is also system-independent, that is to say can be edited data processing devices with various operating systems using different programming languages.

To explain the inventive method in more detail,

DESCRIPTION OF THE PREFERRED EMBODIMENTS

Figure 1:
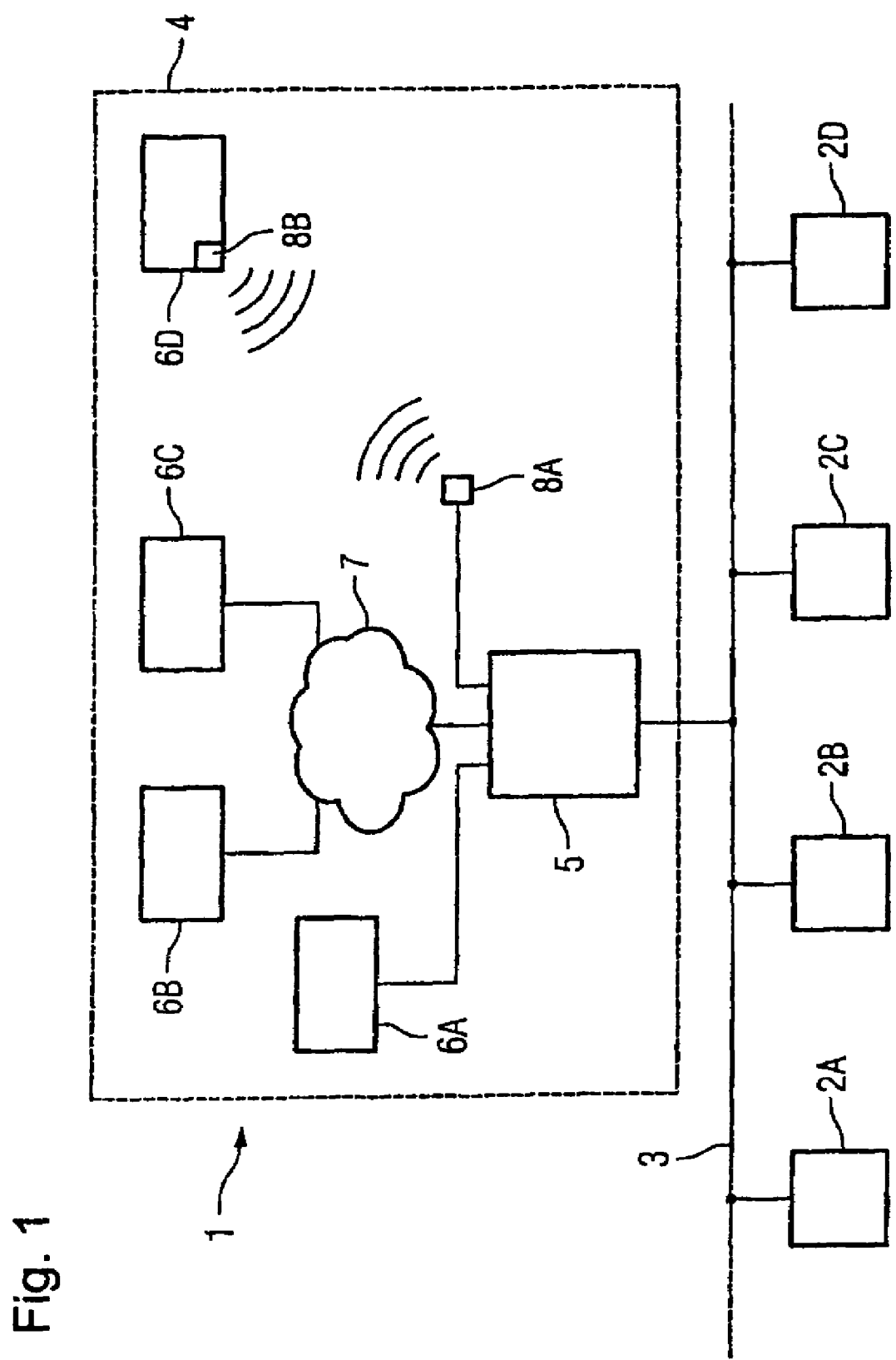
FIG. 1 shows a schematic illustration of an automation system in a block diagram.

FIG. 1 uses a type of block diagram to show one possible design for an automation system 1 by way of example. An automated process (not shown in FIG. 1) involves field transmitters 2A to 2D, which are connected to the automated process via sensors and/or converters (likewise not shown in FIG. 1). The process may be a process-engineering process or an automated production process, for example. In the text below, however, it will be assumed that the process is a power supply system, for example a power supply mains. In this case, the field transmitters connected to the power supply system are control appliances or electrical protective appliances for monitoring and for protecting the power supply mains, for example. The field transmitters 2A to 2D deliver measured data from the process, for example voltage and current measurements, to a data processing device 4 via a bus system 3. In line with FIG. 1, the data processing device 4, which is set up to control the automation system 1, comprises a central computer 5 and user devices 6A to 6D, which communicate with the central computer 5 by means of various options. For example, the user device 6A, which may be a local control station, for example, is hardwired directly to the central computer 5. The user devices 6B and 6C, e.g. office or control room computers, are connected to the central computer 5 via a network 7, for example the Internet or an Intranet, and the user device 6D, e.g. a laptop, is wirelessly connected to the central computer 5 by means of combined transmission and reception devices 8A and 8B.

Figure 2:
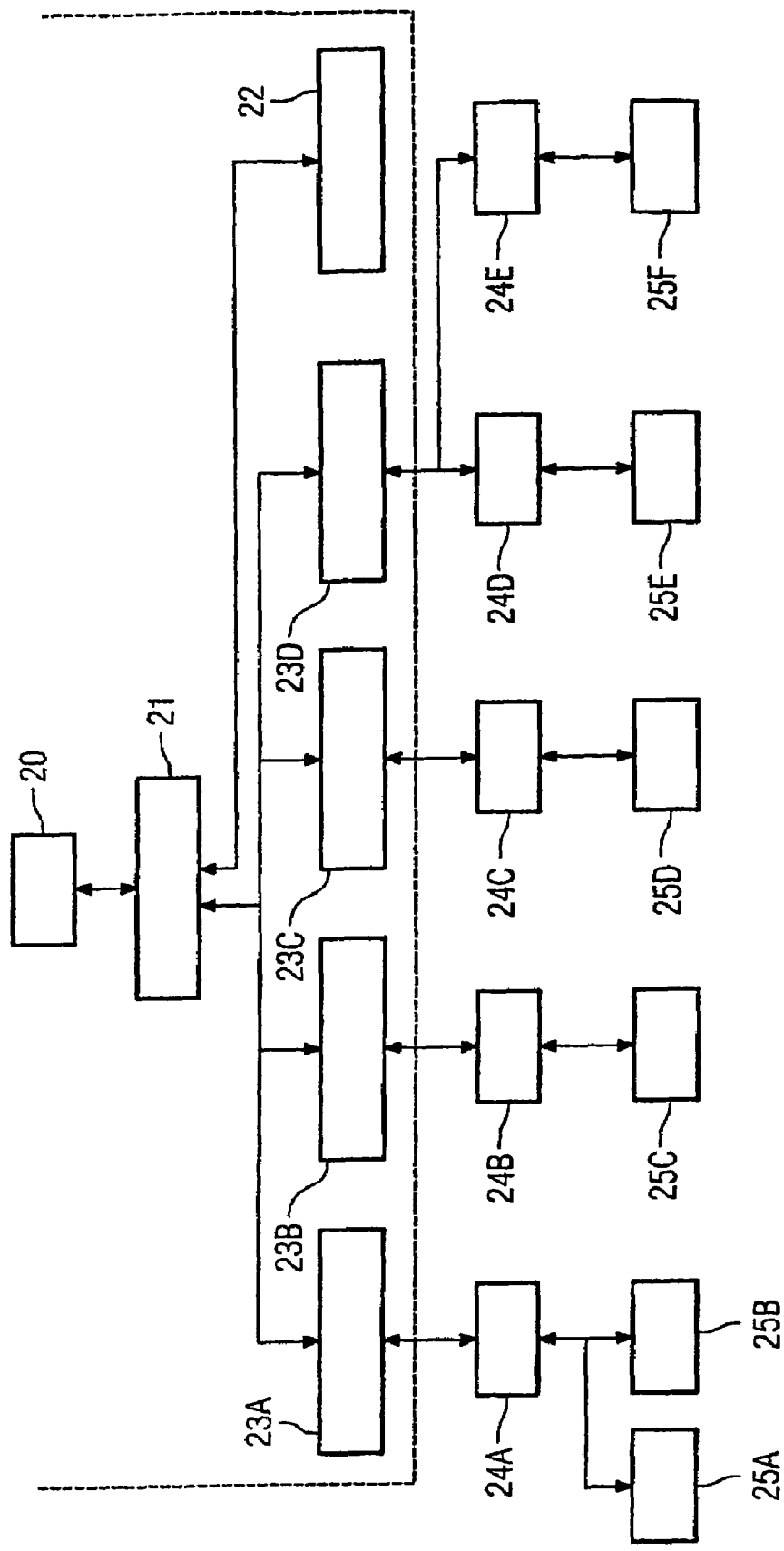
FIG. 2 shows an exemplary embodiment of a structure representation which describes a specific automation system.

FIG. 2 uses a tree structure to show an exemplary embodiment of a design for a (specific) automation system of this type with a plurality of components. In this context, a central processor unit (CPU) 20, which may be held in the central computer 5 shown in FIG. 1, for example, first of all controls an integral driver device 21 which is used to regulate the communication between the CPU 20 and the remaining components of the automation system, for example. The integral driver 21 can also retrieve an information block 22. By way of example, information contained in the information block 22 can contain a version number and a production date for the integral driver 21. In line with FIG. 2, the integral driver 21 in turn controls four "single drivers" 23A to 23D, which in turn have particular appliances 24A to 24E subordinate to them. It can be seen that the fourth single driver 23B at this location has two associated appliances 24D and 24E. In a subsequent structure plane, the appliances 24A to 24E finally have subordinate sensors 25A to 25F which are connected to the process.

It is also possible to see in FIG. 2 that most components of the specific automation system shown in FIG. 1 correspond to particular blocks in the structure representation shown in FIG. 2. In this context, some blocks in FIG. 2 represent clear components of the specific automation system, for example appliances 24A to 24E and sensors 25A to 25F. Others represent software components, for example single drivers 23A to 23D or the integral driver 21. The information block 22 has no actual depiction in the specific automation system and in this context serves merely to give a structure to data and information within the structure representation and hence serves to provide them with better clarity. Said software components and the information block 22 will normally be produced on the data processing device 4 (cf. FIG. 1), which is indicated in FIG. 2 by a dashed frame.

For the automation system to operate, it is necessary for there to be such a structure representation of the specific automation system with its relevant components for a piece of control software for the data processing device 4 shown in FIG. 1. In line with the invention, such a structure representation is obtained from a model structure representation, as shown in FIG. 3, for example.

Figure 3:
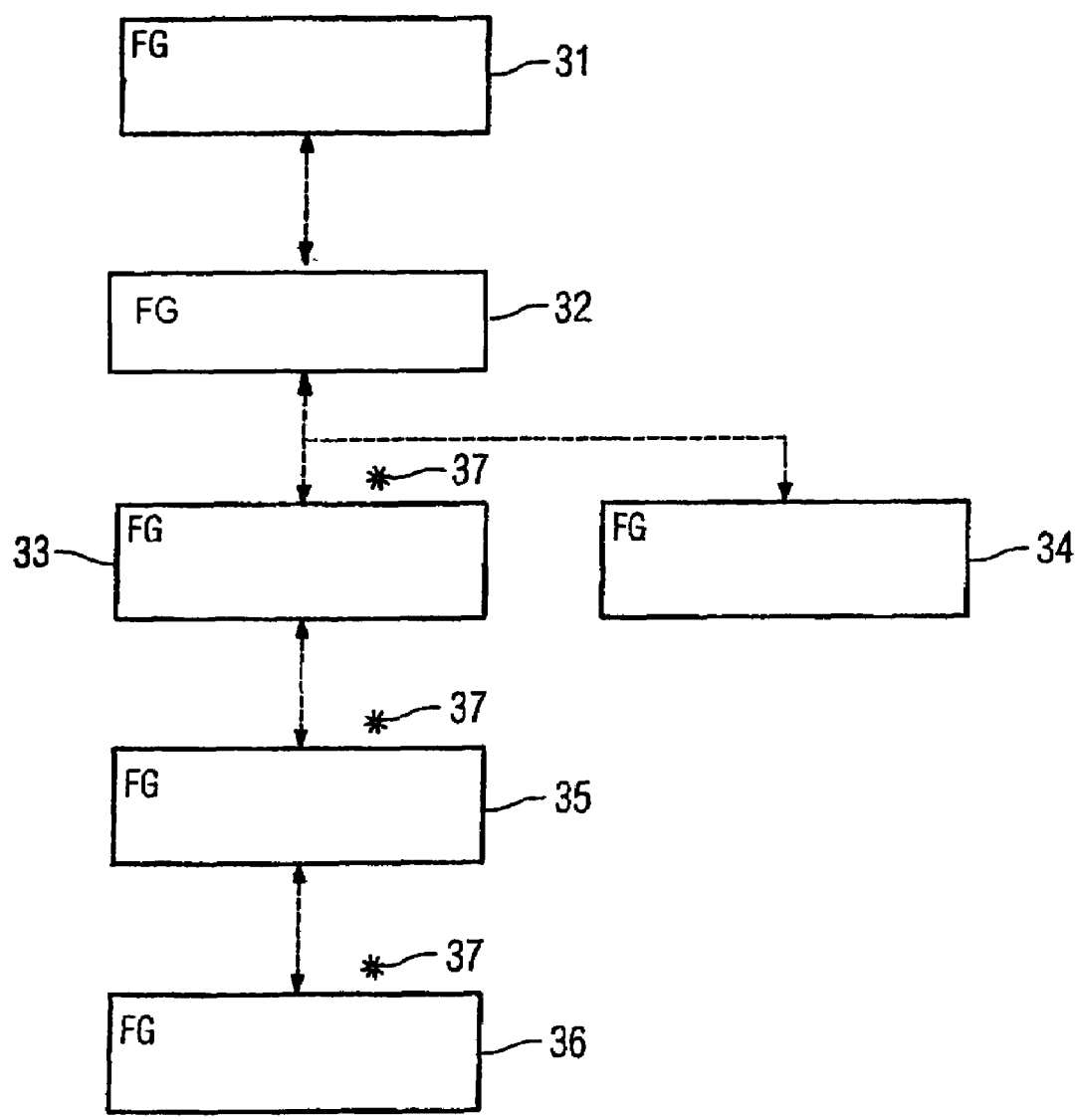
FIG. 3 shows an exemplary embodiment of a model structure representation which describes a general automation system.

FIG. 3 shows such a model structure representation by way of example, said model structure representation being able to be applied generally to a large number of automation systems. In this context, instead of individual components of a specific automation system the figure shows only their functional groups, that is to say classes of components in a fictitious automation system, so to speak. This is identified in the illustration shown in FIG. 3 by the abbreviation "FG" in the top left-hand corner of each individual block. In line with FIG. 3, the topmost structure plane holds a functional group (FG) CPU 31 which is superordinate to an FG "integral driver" 32. The FG "integral driver" 32 is in turn superordinate to functional groups "single driver" 33 and "information" 34 which are arranged parallel to one another. Finally, the FG "single driver" 33 has a subordinate FG "appliance" 35 and the latter has a subordinate FG "sensor" 36. A model structure representation of this type can be used generally to describe the design of a multiplicity of automation systems.

To generate a structure representation of a specific automation system from the model structure representation shown in FIG. 3, for example in a similar manner to FIG. 2, it is necessary to ascertain the true number of components which can be assigned to the respective functional groups, particularly at the locations indicated by asterisks 37 in FIG. 3. By way of example, the functional group "single driver" can be assigned a plurality of single driver components in a specific automation system. In addition, the individual components of the specific automation system need to be entered into the model structure representation, in order to obtain a corresponding structure representation therefrom.

The procedure which is to be applied for this purpose will be described in more detail below:

To match a piece of control software to a specific automation system, a model structure representation, for example as shown in FIG. 3, is first of all required in the form of a text file. Such a text file can be created particularly conveniently in XML (Extended Markup Language) format, since XML can be used particularly well for describing hierarchically structured systems. An example of such a text file in a shortened XML version is indicated below:

```
1    <CPU>
2    <Integral driver>
3    <Information>
4    <Driver number    type = "int"/>
5    <Date of creation type = "string"/>
6    </Information>
7    <Single driver ResolveCardinalities = "true" Key = "Driver
     No.">
8    <Status type = "string"/>
9    <Designation type = "string"/>
10   <Appliance ResolveCardinalities = "true" Key = "Appliance
     No.">
11   <Status type = "string"/>
12   <Designation type = "string"/>
:
:
:
21   <Sensor Resolve Cardinalities = "true" Key = "Sensor No.">
:
:
:
31   </Sensor>
32   </Appliance>
33   </Single driver>
34   </Integral driver>
35   </CPU>
```

Such a text file can be used to describe the model structure representation shown in FIG. 3. By way of example, the text file shows the individual functional groups "CPU", "Integral driver", "Information" etc., which have further associated data when required. By way of example, the functional group "Information" may contain data indicating a driver number or a date of creation. This is indicated in lines 4 and 5 of the text file shown. In addition, the respective data type used is also indicated, for example the data type "integer" (int) is used for the driver number, and the date of creation is in the "string" type. In line 7 the text file also shows the instruction "ResolveCardinalities =true", which means that at this location in the functional group "Single driver" it would be possible to assign not just a single component but rather a plurality of single driver components of the specific automation system jointly. To distinguish between the individual single driver components of the specific automation system, the expression Key ="Driver No." is used to stipulate the addressing number, for example, of a single driver component as a unique identification key. The same applies to the functional groups "Appliance" and "Sensor" with the identification keys appliance number (appliance No.) and sensor number (sensor No.).

A text file in such or similar a form needs to be made available to the data processing device which controls the specific automation system. By way of example, it is transmitted to the data processing device after it has been created on a programming workstation. However, one particular advantage in the use of such a model structure representation is that a single model structure representation in the form of a text file can be copied a plurality of times and can be used for a plurality of automation systems. The development and programming involvement in advance is thus significantly reduced.

The data processing device in the specific automation system then needs to be used to convert the model structure representation into a structure representation which is matched to the specific automation system. To this end, the data processing device checks the text file for instructions such as "ResolveCardinalities =true", for example, in order to ascertain those locations at which there may be a plurality of components which can be assigned to a functional group. At these locations, the data processing device requests the relevant components in the specific automation system, for example by virtue of the data processing device transmitting an electronic query containing the respective type of an identification key which has been sought for the specific functional group. This electronic query is respectively answered by the components which can be assigned to this functional group by virtue of them sending their identification key, e.g. their appliance number, to the data processing device as an electronic response.

Alternatively, it is also possible for all or some similar components of the specific automation system to have a super-ordinate common control device which receives the electronic query and coordinates the responses of the respective components to the data processing device.

Together with the identification key, it is also possible to send further data characterizing the respective component, for example, such as a more accurate designation for the component or the status of the component (e.g. on, off, fault). The data processing device enters the returned components into the text file using their identification keys and checks the further structure planes of the text file in similar fashion.

At all locations at which there are instructions to check the specific automation system for a plurality of components which can be jointly assigned to a functional group, the data processing device carries out the method which has just been described. In this way, all components of the automation system which can be jointly assigned to a respective functional group are incorporated into the text file, so that ultimately a structure representation of the specific automation system, likewise in text form, is produced, as indicated again in shortened version and in XML format below by way of example:

```
1    <CPU>
2    <Integral driver>
:
:
11   <Single driver Key = "Driver No."      Driver No. = "100">
:
:
21   <Appliance Key = "Appliance No."       Appliance No. = "1">
:
:
31   <Sensor Key = "Sensor No.">            Sensor No. = "1001">
:
:
41   </Sensor>
42   <Sensor Key = "Sensor No.">            Sensor No. = "1002">
:
:
51   </Sensor>
52   </Appliance>
53   <Appliance Key = "Appliance No."       Appliance No. = "2">
:
:
61   </Appliance>
:    </Single driver>
:
:
71   </Integral driver>
72   </CPU>
```

From the structure representation shown for the specific automation system in text format, it can be seen that individual components, such as a single driver with the driver number 100, are entered below the functional group "Integral driver", for example. The single driver with driver No. 100 has subordinate appliances with the appliance numbers (appliance No.) 1 and 2 in the structure representation shown. Further appliances may be listed in a similar manner. The appliance with appliance No. 1 in turn has subordinate sensors with the sensor numbers 1001 and 1002. The structure explained corresponds to the left-hand branch of the tree structure of the specific automation system with the first single driver 23A, and the first appliance 24A and the sensors 25A and 25B which is shown in FIG. 2, for example. The other branches of the structure representation shown in FIG. 2 can be transferred to the structure representation in text format in similar fashion.

In addition to the respective identification keys, such as driver numbers, product numbers and sensor numbers, of the individual identified components, it is also possible for further data describing the components to be incorporated into the structure representation. Thus, by way of example, this may contain information indicating a status for the respective component and a more accurate designation for the component.

In addition to such components as can be jointly assigned to a functional group in the model structure representation, the other components of the specific automation system can also be entered into the model structure representation in the same cycle to form a complemented structure representation of the specific automation system. In the case of these components, precisely one component is therefore assigned to precisely one functional group. In the case of FIGS. 2 and 3, this applies to the CPU 20 and the functional group "CPU" 31, for example. These other components can be detected in similar fashion to the procedure described with an electronic query from the data processing device and a corresponding electronic response from the respective component, where, by way of example, a value for an identification key for the respective component is transmitted to the data processing device and is entered into the model structure representation. In similar fashion to the method described above, it is possible, in this case too, to send further data identifying the respective component in addition to the identification keys. In this way, a full structure representation of the specific automation system with all the available components is finally obtained from the model structure representation.

To designate a component of the specific automation system and possibly to request information or measured data from the latter or to transmit it to the latter, the data processing device needs to use unique addressing for the respective component. In this context, it is appropriate to use what are known as component paths—or else entity paths—in which, in similar fashion to the form which is used by known office and home computer operating systems, the respective components are listed separated by oblique strokes. It is important that to address a specific component of the specific automation system the respective identification keys which are unique for the sought component also need to be incorporated into the component or entity path in addition.

The text below shows an example of a component path for addressing the first appliance 24A (cf. FIG. 2) and for requesting its status:

"CPU/Integral driver/Single driver['Driver No. =100']/Appliance['Appliance No. =1']/Status"

Organization and navigation using such paths can be carried out particularly conveniently using the XPath language normalized by the standardization committee W3C, for example. Further information relating to XPath can be retrieved on the Internet at the URL http://www.w3.org/TR/xpath.

In addition, it may be advantageous not just to address a specific component using an appropriate component path, but rather to obtain general information about said component's respective functional group. This information is contained in the model structure representation. Information about a functional group may be "metadata", for example, which indicate a data type in which data can be received or sent by components of the specific automation system which are associated with the respective functional group. When a component path as indicated above is used, it is a particularly simple matter to generate a "type path" for retrieving such information about the individual functional groups. The reason for this is that this simply requires all parts of the component path which respectively contain the specific identification keys of components of the specific automation system to be removed; in the example above, the type path remaining is as follows, for example:

"CPU/Integral driver/Single driver/Appliance/Status"

This type path can now be used to request general information about the file format, for example, in which the status of the individual components associated with the functional group "Appliances" is output. This indicated type path refers to line 11 of the text file indicated above, for example, in which the data type indicated for the status of the functional group "Appliance" is the type "string".

Using the structure representation produced in this manner for the specific automation system, a user of the automation system can also access specific components of the automation system very easily. To this end, a display device or an external computer with a display device can be connected to the central computer in the data processing device, for example, and can allow navigation in the automation system in a browser window, for example, as shown by way of example in FIG. 4.

Figure 4:
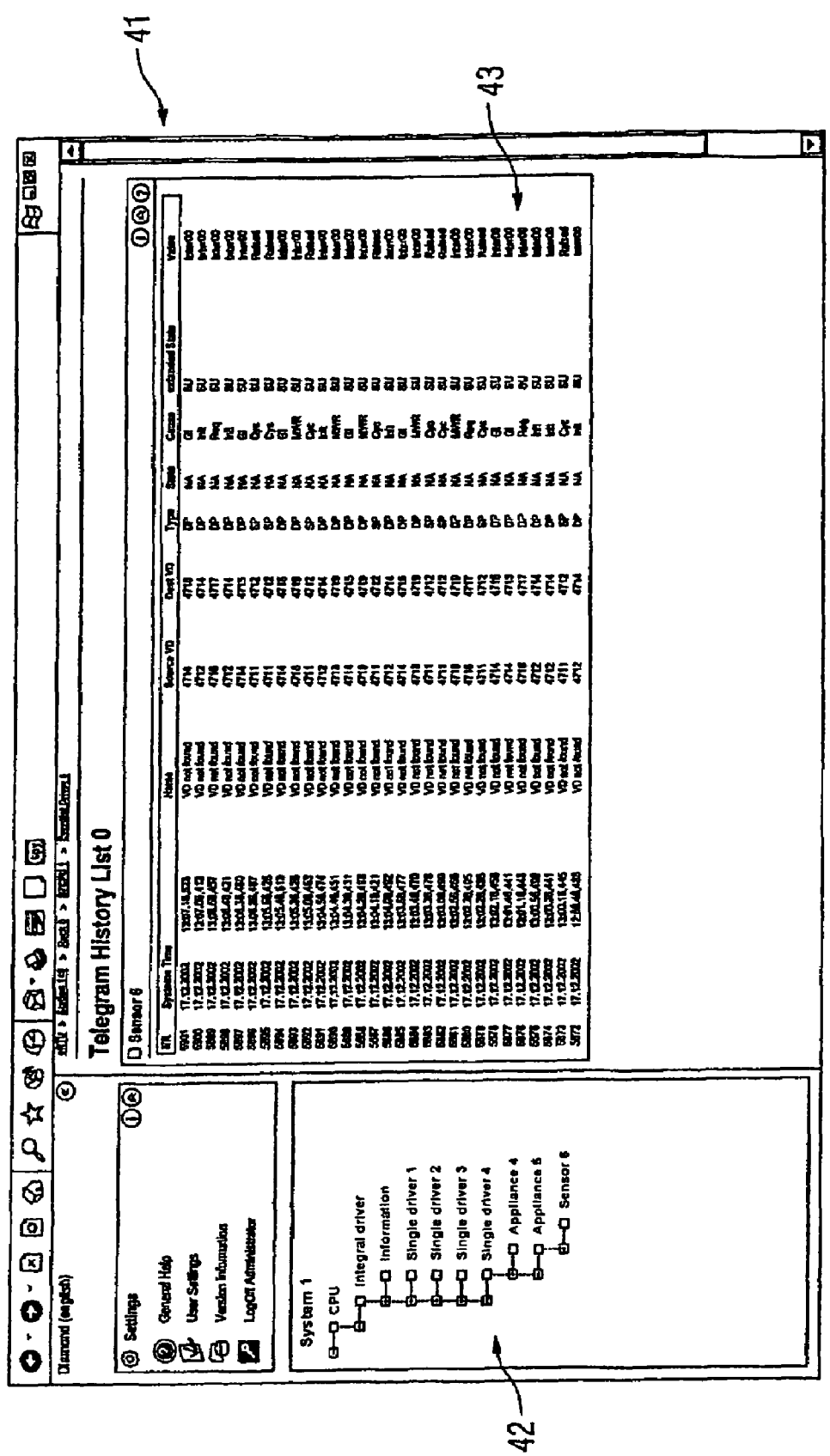
FIG. 4 shows an exemplary embodiment of a user display for operating an automation system.

FIG. 4 shows a browser window 41 in which, besides other information, particularly a structure representation of the specific automation system ("System 1") is shown in a graphical representation as a structure tree 42 by way of example. Using such a (graphical) structure representation of the specific automation system, a user of the automation system can, by way of example, access the sixth sensor—as indicated by the structure tree 42—(cf. 25F in FIG. 2) and can retrieve particular information, such as measurements or status values, from the sensor. This information can then be displayed in a further window 43 in the form of a table, for example. The graphical representation of such a structure representation describing the specific automation system can be generated comparatively easily from an XML file as indicated above. This can be converted either directly by the central computer of the data processing device or by the browser device of a user computer connected to the central computer of the data processing device, for example.

We claim:

1. A method of generating a structure representation describing a specific automation system from a model structure representation describing a general automation system, wherein the model structure representation has a structured representation of functional groups in the general automation system and respective links to one another, and each functional group is assignable one or more components of the specific automation system, the method which comprises the following steps:

provide a text file representing the model structure representation to a data processing device that controls the specific automation system;

determining, with the data processing device, those components of the specific automation system that are jointly assignable to a functional group in the model structure representation; and entering the components ascertained in the determining step into the model structure representation to generate the structure representation describing the specific automation system.

2. The method according to claim 1, wherein instructions contained in the text file prompt the data processing device to check only selected functional groups to determine whether a plurality of components of the specific automation system are jointly assignable to the functional group.

3. The method according to claim 1, wherein:

the determining step comprises sending an electronic query to the respective components or to a common control device that is superordinate to the respective components; and the method further comprises responding, with the respective components or with the superordinate common control device, to the electronic query by sending an electronic response to the data processing device with a respectively unique identification key.

4. The method according to claim 3, wherein components of the specific automation system can each be jointly assigned to a functional group in the model structure representation using identification keys of a common type when sending the electronic response.

5. The method according to claim 3, wherein the responding step comprises transmitting further data characterizing the respective components with the electronic response.

6. The method according to claim 1, which comprises also determining a component for a functional group that is assignable a single component and entering the single component into the model structure representation to complete the structure representation describing the specific automation system.

7. The method according to claim 1, which comprises addressing the respective components of the specific automation system with the data processing device using a component path that contains at least one identification for the respective component.

8. The method according to claim 7, which comprises:

ascertaining, with the data processing device, information that is typical of a component of a functional group or that is common to a plurality of components of a functional group by generating from the relevant component path a type path indicating the relevant functional group; and using the type path with the data processing device to read the information for the relevant functional group from the text file.

9. The method according to claim 2, which comprises formulating the component path and the type path with the language XPath.

10. The method according to claim 1, which comprises converting the structure representation describing the specific automation system into a graphical representation by the data processing device.

11. The method according to claim 10, which comprises displaying the graphical representation based on the structure representation on a user device associated with the data processing device.

12. The method according to claim 10, which comprises converting the structure representation into the graphical representation, and displaying the graphical representation using a browser device on a user device.

13. The method according to claim 1, which comprises using XML for the text file representing the model structure representation.

14. A method of generating a structure representation describing a specific automation system from a model structure representation describing a general automation system, wherein the model structure representation has a structured representation of functional groups in the general automation system and respective links to one another, and each functional group is assignable one or more components of the specific automation system, the method which comprises the following steps:

providing a text file representing the model structure representation to a data processing device that controls the specific automation system;

determining, with the data processing device, those components of the specific automation system that are jointly assignable to a functional group in the model structure representation;

entering the components ascertained in the determining step into the model structure representation to generate the structure representation describing the specific automation system;

addressing the respective components of the specific automation system with the data processing device using a component path that contains at least one identification for the respective component;

ascertaining, with the data processing device, information that is typical of a component of a functional group or that is common to a plurality of components of a functional group by generating from the relevant component path a type path indicating the relevant functional group, thereby generating the type path from the component path by removing the at least one identification for the respective component from the component path to form the type path; and using the type path with the data processing device to read the information for the relevant functional group from the text file.

* * * * *